(12) United States Patent
Dunbar et al.

(10) Patent No.: US 10,938,599 B2
(45) Date of Patent: Mar. 2, 2021

(54) ELASTIC VPN THAT BRIDGES REMOTE ISLANDS

(71) Applicant: Futurewei Technologies, Inc., Plano, TX (US)

(72) Inventors: Linda Dunbar, Plano, TX (US); Andrew Malis, Andover, MA (US)

(73) Assignee: Futurewei Technologies, Inc., Plano, TX (US)

( * ) Notice: Subject to any disclaimer, the term of this patent is extended or adjusted under 35 U.S.C. 154(b) by 20 days.

(21) Appl. No.: 15/984,007

(22) Filed: May 18, 2018

(65) Prior Publication Data

US 2018/0343146 A1  Nov. 29, 2018

Related U.S. Application Data

(60) Provisional application No. 62/509,436, filed on May 22, 2017.

(51) Int. Cl.

| H04L 12/723 | (2013.01) |
|---|---|
| H04L 12/46 | (2006.01) |
| H04L 12/733 | (2013.01) |
| H04L 12/911 | (2013.01) |
| H04L 12/715 | (2013.01) |
| H04L 12/851 | (2013.01) |

(Continued)

(52) U.S. Cl.
CPC ...... *H04L 12/4679* (2013.01); *H04L 12/4633* (2013.01); *H04L 45/04* (2013.01); *H04L 45/122* (2013.01); *H04L 45/38* (2013.01); *H04L 45/42* (2013.01); *H04L 45/50* (2013.01); *H04L 45/64* (2013.01); *H04L 47/2425* (2013.01); *H04L 47/825* (2013.01); *H04L 63/0272* (2013.01)

(58) Field of Classification Search
None
See application file for complete search history.

(56) References Cited

U.S. PATENT DOCUMENTS 9,294,393 B1 *  3/2016  Mullooly ............... H04L 41/12
2016/0006672 A1   1/2016  Saavedra
(Continued)

FOREIGN PATENT DOCUMENTS

| CN | 101345649 A | 1/2009 |
|---|---|---|
| CN | 101521621 A | 9/2009 |

(Continued)

OTHER PUBLICATIONS

Machine Translation and Abstract of Chinese Publication No. CN101345649, Jan. 14, 2009, 27 pages.
(Continued)

*Primary Examiner* — Ayaz R Sheikh
*Assistant Examiner* — Sori A Aga
(74) *Attorney, Agent, or Firm* — Conley Rose, P.C.

(57) ABSTRACT

A network device employs a transmitter configured to transmit a registration request to a software defined network (SDN) controller. The network device employs a receiver to receive a reply from the SDN controller. The reply indicates a plurality of provider edge (PE) devices coupled to a carrier network. The network device employs a processor to cause the transmitter and receiver to establish a plurality of asymmetric connections to a virtual private network (VPN) operating over a wide area network (WAN) via the PE devices.

19 Claims, 10 Drawing Sheets

(51) Int. Cl.
  *H04L 12/717* (2013.01)
  *H04L 29/06* (2006.01)
  *H04L 12/721* (2013.01)

(56) References Cited

U.S. PATENT DOCUMENTS

2016/0072669 A1    3/2016  Saavedra et al.
2016/0315808 A1   10/2016  Saavedra
2018/0309662 A1*  10/2018  Clarke ................ H04L 67/2861

FOREIGN PATENT DOCUMENTS

CN          103841022 A    6/2014
CN          104601431 A    5/2015
WO          2017020236 A1  2/2017

OTHER PUBLICATIONS

Machine Translation and Abstract of Chinese Publication No. CN103841022, Jun. 4, 2014, 31 pages.
Foreign Communication From a Counterpart Application, Chinese Application No. 201880004043.3, Chinese Office Action dated Dec. 26, 2019, 6 pages.
Luciani, et al., "NBMA Next Hop Resolution Protocol (NHRP)," RFC 2332, Apr. 1998, 52 pages.
Dunbar, et al., "Seamless Interconnect Underlay to Cloud Overlay Problem Statement," draft-dm-net2cloud-problem-statement-01, Mar. 5, 2018, 18 pages.
Dunbar, et al., "VPN Extension to Dynamic Cloud DC Problem Statement," draft-dm-vpn-ext-to-cloud-dc-problem-statement-01, Oct. 30, 2017, 12 pages.
Machine Translation and Abstract of Chinese Publication No. CN104601431, May 6, 2015, 36 pages.
Foreign Communication From a Counterpart Application, PCT Application No. PCT/CN2018/087748, English Translation of International Search Report dated Aug. 9, 2018, 5 pages.
Foreign Communication From a Counterpart Application, PCT Application No. PCT/CN2018/087748, English Translation of Written Opinion dated Aug. 9, 2018, 4 pages.
Foreign Communication From a Counterpart Application, European Application No. 18805028.0, Extended European Search Report dated Aug. 29, 2019, 8 pages.

* cited by examiner

ELASTIC VPN THAT BRIDGES REMOTE ISLANDS

CROSS-REFERENCE TO RELATED APPLICATIONS

This patent application claims the benefit of U.S. Provisional Patent Application No. 62/509,436, filed May 22, 2017, by Linda Dunbar, et al., and titled "Elastic VPN That Bridges Remote Islands," which is hereby incorporated in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Many enterprise networks employ cloud computing to offload processing tasks to third party datacenters. Virtual networking techniques can be used to securely transmit data between the enterprise networks and the data centers housing the cloud networks. This system allows enterprise users to move application functionality between datacenters, for example to dynamically allocate processing power at datacenters that are geographically closest to an active end user base at any specified date/time. This approach allows processing power to be dynamically allocated and deallocated to support branch office networks that rely on the enterprise network. Unfortunately, the virtual networking techniques managing routing between the branch office networks and the third party datacenters may not scale well when thousands of branch office networks are employed in such an architecture.

SUMMARY

In an embodiment, the disclosure includes a network device comprising: a transmitter configured to transmit a resolution request to a software defined network (SDN) controller; a receiver coupled to the transmitter, the receiver configured to receive a reply from the SDN controller, the reply indicating a plurality of provider edge (PE) devices coupled to a carrier network; and a processor coupled to the transmitter and receiver, the processor configured to cause the transmitter and receiver to establish a plurality of asymmetric connections to a virtual private network (VPN) operating over a software defined wide area network (SD-WAN) via the PE devices.

Optionally, in any of the preceding aspects, another implementation of the aspect includes, wherein the plurality of asymmetric connections include a wireless connection, an access network connection, a public internet connection, or combinations thereof.

Optionally, in any of the preceding aspects, another implementation of the aspect includes, wherein establishing the plurality of asymmetric connections does not include establishing a full mesh of connections with all devices connected to the VPN.

Optionally, in any of the preceding aspects, another implementation of the aspect includes, wherein at least one of the PE devices is coupled to the carrier network and not coupled to the VPN.

Optionally, in any of the preceding aspects, another implementation of the aspect includes, wherein the transmitter is further configured to transmit a registration request including client information entries that indicate client local addresses, client virtual network identifiers, tunnel identifiers, or combinations thereof, to the SDN controller.

Optionally, in any of the preceding aspects, another implementation of the aspect includes, wherein establishing the plurality of asymmetric connections includes establishing tunnel connections directly from local clients coupled to the network device to destinations coupled to the VPN.

Optionally, in any of the preceding aspects, another implementation of the aspect includes, wherein the resolution request indicates a client address for a target client and requests the SDN controller select a PE device to connect the target client to the VPN.

Optionally, in any of the preceding aspects, another implementation of the aspect includes, wherein the resolution request contains a code requesting PE devices be selected with minimized exposure to a public internet.

Optionally, in any of the preceding aspects, another implementation of the aspect includes, wherein the reply is a resolution reply containing a code indicating the PE devices are associated with a connection with minimized exposure to a public internet.

In an embodiment, the disclosure includes a software defined network (SDN) controller comprising: a receiver configured to receive an enhanced next hop resolution protocol (eNHRP) registration request from a network device, the eNHRP registration request including client information entries that indicate client local addresses of client nodes sharing a local area network with the network device; a processor coupled to the receiver, the processor configured to select one or more provider edge (PE) devices coupled to a carrier network, the PE devices positioned to couple the client nodes to a virtual private network (VPN) operating over a wide area network (WAN); and a transmitter coupled to the processor, the transmitter configured to transmit an eNHRP resolution reply indicating the PE devices to the network device to support establishing connections between the client nodes and the VPN via the PE devices.

Optionally, in any of the preceding aspects, another implementation of the aspect includes, wherein the at least one of the PE devices is coupled to the carrier network and not coupled to the VPN.

Optionally, in any of the preceding aspects, another implementation of the aspect includes, wherein the PE devices support asymmetric connections between the client nodes and the VPN.

Optionally, in any of the preceding aspects, another implementation of the aspect includes, wherein the client information entries of the eNHRP registration request further include client virtual network identifiers and tunnel identifiers associated with the client nodes.

Optionally, in any of the preceding aspects, another implementation of the aspect includes, wherein the eNHRP registration request includes a flag indicating the client nodes should not be completely connected to all nodes operating in the VPN.

Optionally, in any of the preceding aspects, another implementation of the aspect includes, wherein the receiver is further configured to receive a eNHRP resolution request containing a code requesting PE devices be selected with minimized exposure to a public internet.

In an embodiment, the disclosure includes a carrier network comprising: a plurality of provider edge (PE) devices interconnected by a multi-protocol label switching (MPLS) network, the PE devices configured to implement a wide area network connecting traffic from at least one data center network, at least one headquarter network, and at least one remote network; and a virtual private network (VPN) configured to securely communicate the traffic between the data center network, the headquarter network, and the remote network via internet protocol security (IPsec) tunnels across the MPLS network, the remote network connected to the MPLS network by the VPN via at least one third party network, and the remote network containing at least one client that is connected to some but not all nodes in the VPN.

Optionally, in any of the preceding aspects, another implementation of the aspect includes, wherein the VPN is connected to clients in the remote network via a plurality of asymmetric connections over a plurality of communication media.

Optionally, in any of the preceding aspects, another implementation of the aspect includes, further comprising a software defined network (SDN) controller configured to receive an enhanced next hop resolution protocol (eNHRP) registration request from the remote network, the eNHRP registration request including client information entries that indicate client local addresses of clients in the remote network.

Optionally, in any of the preceding aspects, another implementation of the aspect includes, wherein the SDN controller is further configured to employ the client local addresses to control creation of IPsec tunnels directly from the clients in the remote network to the VPN.

Optionally, in any of the preceding aspects, another implementation of the aspect includes, wherein the SDN controller is further configured to transmit an eNHRP resolution reply to the remote network, the eNHRP resolution reply indicating one or more PE devices for connection to the MPLS network, the PE devices indicated based on geographic distance to the remote network and not based on PE device attachment to the VPN.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
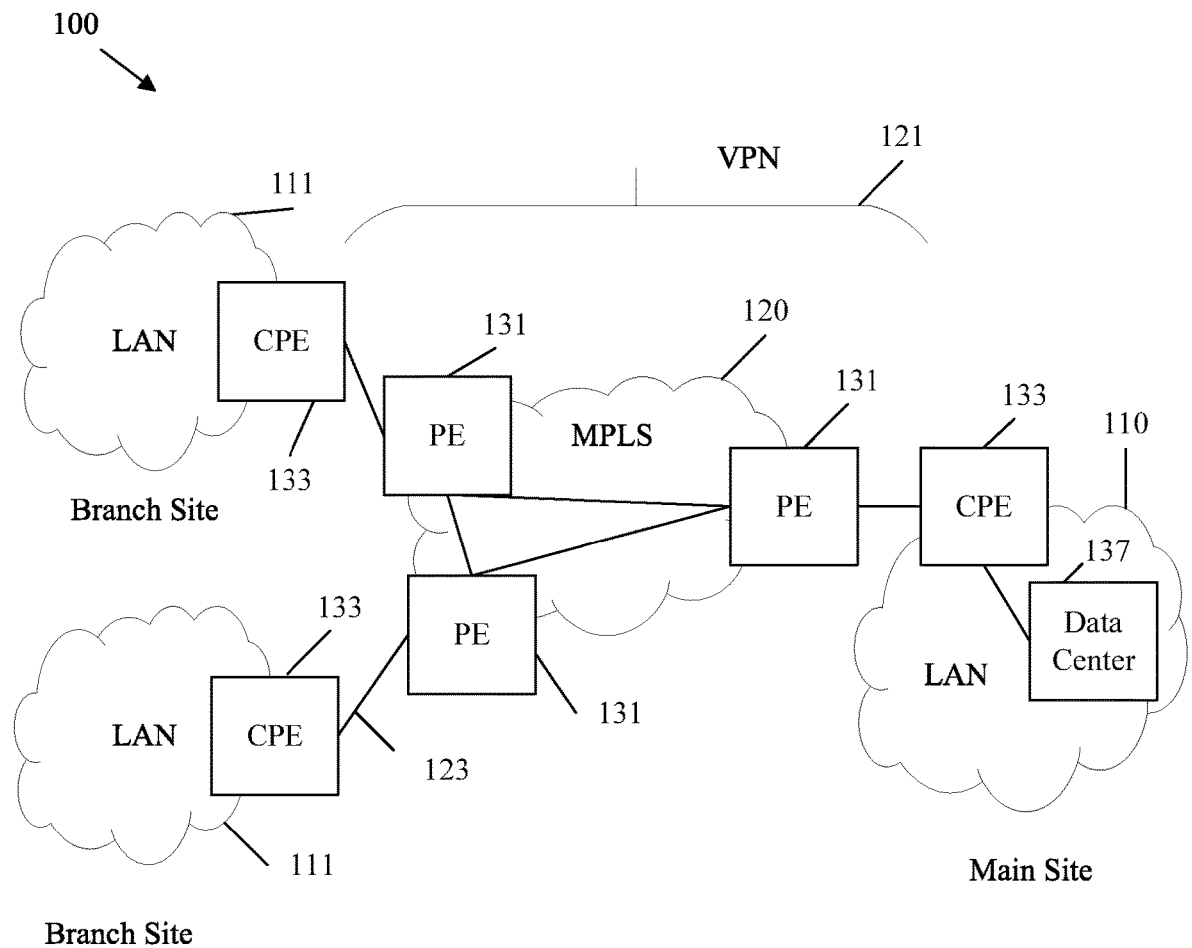
FIG. 1 is a schematic diagram of an example network employing a Virtual Private Network (VPN) to connect island networks by employing IGPs.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used herein, an island is a small network, such as a branch office network, that is physically separated from a corresponding enterprise network. In some real world cases, an enterprise network may be connected to fifty thousand or more branch office networks, such as networks for retail stores, insurance agency branch offices, etc. A Software Defined Wide Area Network (SDWAN) may be employed to connect the branch offices to the enterprise network and to the relevant third party datacenter (DC) networks. As used herein, an SDWAN is a software controlled network that employs virtual networking techniques, such as virtual private networks (VPNs), internet protocol security (IPsec) tunnels, Multiprotocol Label Switching (MPLS) tunnels, and other virtual network management mechanisms to allocate networking resources, provide security, and provide service level agreement (SLA) guarantees for data communications between network endpoints, such as islands. The islands may employ customer premises equipment (CPE) to connect to the SDWAN. A CPE is a terminal, such as a router, that is located at an island and provides internet access to the corresponding branch network. The SDWAN operates on a carrier network that includes provider edge (PE) devices that act as gateways for the CPEs. Accordingly, the SDWAN may provide virtual network tunnels between CPEs to interconnect the various branches, the third party data center, and/or the enterprise network.

The abovementioned architecture includes certain deficiencies. For example, when CPEs are geographically distant, for example when positioned in different countries and/or different continents, the delay, bandwidth, quality of service (QoS), etc. may be unpredictable causing difficulties when enforcing the SLA. Further, when many thousands of islands are connected, many thousands of IPsec tunnels are employed. CPEs may be unable to handle such a high volume of IPsec tunnels, which limits the networks ability to scale. In addition, this scheme enforces security between CPEs. The third party DC may control an internal network between the corresponding CPE and the virtual machines (VMs), containers, servers, etc., operating the applications.

Accordingly, the SDWAN may be unable to maintain end-to-end security between the islands and the workload at the DC.

Disclosed herein are mechanisms to implement an elastic VPN to bridge remote islands while mitigating the above-mentioned concerns. The SDWAN is managed by a software defined network (SDN) controller. An SDN controller is a network device configured to manage network routing and data flow control based on applications and control logic in a carrier network. CPEs operating on islands transmit enhanced next hop resolution protocol (eNHRP) registration requests to the SDN controller. The eNHRP registration requests include client information entries (CIEs) that describe the local addresses and virtual network information, such as virtual network identifiers (IDs) and tunnel IDs. This information allows the SDN controller to orchestrate the configuration of several functions. In an example embodiment, the SDN controller can send a eNHRP registration response to the CPE that indicates the PEs attached to the carrier network that are located geographically closest to the CPE. Accordingly, the CPE can connect to the closest PE attached to the carrier network instead of the closest PE that is already authenticated into the VPN. This minimizes the portion of the connection that traverses an uncontrolled network, such as the public Internet, and hence minimizes unpredictable network behavior that is beyond the control of the carrier network. Further, this allows the SDN controller to orchestrate the creation of secure network tunnels through the CPE and to the workload, which provides an end-to-end security solution. Such end-to-end security may also remove responsibility for corresponding tunnel management from the CPE in some cases. In addition, the SDN controller can transmit a eNHRP resolution reply with multiple PEs to support connections over multiple communication media. Accordingly, the CPE can create multiple asymmetric connections with multiple PEs over multiple interfaces, such as over a wireless long term evolution (LTE) interface, an access network interface, a public internet interface, etc. This in turn allows control of varying levels of SLA and connection management for applications and/or virtual networks operating at the island. In a further example, the CIE information may provide enough information to the SDN controller to determine which subnets on the island should be connected to other subnets in the network. Accordingly, the network need not create a full mesh network between all CPEs in the network, which supports increased scalability. For example, the SDWAN can employ the CIE information to avoid employing interior gateway protocols (IGPs). Such IGPs may require the CPEs to maintain routing tables with information associated with the complete set of other CPEs in the network, which in turn limits network scalability when thousands of CPEs are employed in the SDWAN.

FIG. 1 is a schematic diagram of an example network 100 employing a VPN to connect island networks by employing IGPs. The network 100 includes a carrier network 120 coupling branch sites 111 to a main site 110. The branch sites 111 are islands that are physically separated from the main site 110. For example, the branch site 111 may include a store, a remote office, a franchise, etc. of a business operating at the main site 110. The branch sites 111 employ a local area network (LAN), which is a small network that interconnects network capable devices within a small geographical area, such as a building or a collection of adjacent buildings. Various applications operating on the LANs in the branch sites 111 may be served by processing functions operating on the main site 110. For example, the branch sites 111 may include client machines that are served by the main site 110. The branch sites 111 employ a CPE 133 that acts as a local gateway for communications entering and leaving the LAN. A CPE 133 is a terminal, such as a router, that is located at an island and provides non-local network access (e.g., Internet access, carrier network 120 access, etc.) to the corresponding branch network 111.

The main site 110 may include a corporate campus or other enterprise facility that supports the branch sites 111. The main site 110 also includes a LAN to connect network traffic and a CPE 133 for communicating with the branch sites 111. In this example, the main site 110 includes a data center 137. The data center 137 is a collection of servers and related computing and network equipment that provides computing resources to operate applications and serve applications operating at the branch sites 111. Such resources may include hardware resources such as processors, random access memory (RAM), long term memory storage (e.g., read only memory (ROM), memory backup, etc.), and/or virtualized computing resources such as VMs, containers, etc. The data center 137 communicates with the branch sites 111 via the LAN at the main site 110, the CPE 133 at the main site 110, the carrier network 120, and the CPEs 133 at the branch sites 111.

The carrier network 120 connects the branch sites 111 to the main site 110. The carrier network 120 includes a network of interconnected nodes, such as routers, switches, etc. that transport communications between other networks. The carrier network 120 may be an electrical network, an optical network, an electro-optical network, etc. The carrier network 120 communicates with other networks via provider edge (PE) 131 devices. A PE 131 is a router or other gateway communication device between a services providers administrative domain (e.g., the carrier network 120) and administrative domains managed by other networks (e.g., the public Internet, branch sites 111, main site 110, etc.). In some examples, the carrier network 120 employs MPLS. MPLS is a data transmission technique that includes setting up pathways through the carrier network 120 and associating labels with such pathways. When a data packet is received at a PE 131, a label is attached to the packet. The packet is then switched through the network based on the label. MPLS allows for dedicated pathways to be setup through a carrier network 120 so that packets traverse the carrier network 120 in a consistent manner.

A VPN 121 can be organized to securely route communications between the branch sites 111 and the main site 110. The VPN 121 includes an allocated set of network resources, such as security resources and communication resources. Devices that are authenticated to access the VPN 121 can access a particular subset of carrier network 120 resources, which results in a virtualized network that is private to the authenticated devices. The VPN 121 can be an open systems interconnect (OSI) model layer two network or an OSI layer three network that operates as a broadcast network or an addressable point to point network, respectively. The VPN 121 can be implemented by employing internet protocol security (IPsec) tunnels 123 between the CPEs 133 that traverse the PEs 131 and the carrier network 120. IPsec tunnels 123 are point to point communication tunnels that secure communications by encrypting packets entering the tunnel and decrypting packets leaving the tunnel. Network 100 employs interior gateway protocols (IGPs), such as Open Shortest Path First (OSPF), Routing Information Protocol (RIP), Intermediate System to Intermediate System (IS-IS), and Enhanced Interior Gateway Routing Protocol (EIGRP). IGPs are broadcast protocols that share routing data within a network. Accordingly, IGPs share routing data between the PEs 131 so that routes across the carrier network 120 can be resolved.

As shown in FIG. 1, each CPE 133 maintains an IPsec tunnel 123 to all other CPEs 133, which creates a full mesh network. IGPs are employed to resolve the mesh. Such a system works well when the VPN 121 connects a small number of static branch sites 111 to a main site 110. However, a complete mesh employs an exponentially increasing number of IPsec tunnels 123 as additional branch sites 111 are added to the VPN 121. When hundreds or thousands of branch sites 111 are added, the CPEs 133 may be unable to maintain a corresponding number of IPsec tunnels 123. Further, the IPsec tunnels 123 may be statically defined. This means an administrator may add and remove tunnels to manage the VPN 121. This approach is cumbersome when hundreds or thousands of branch sites 111 are employed.

Figure 2:
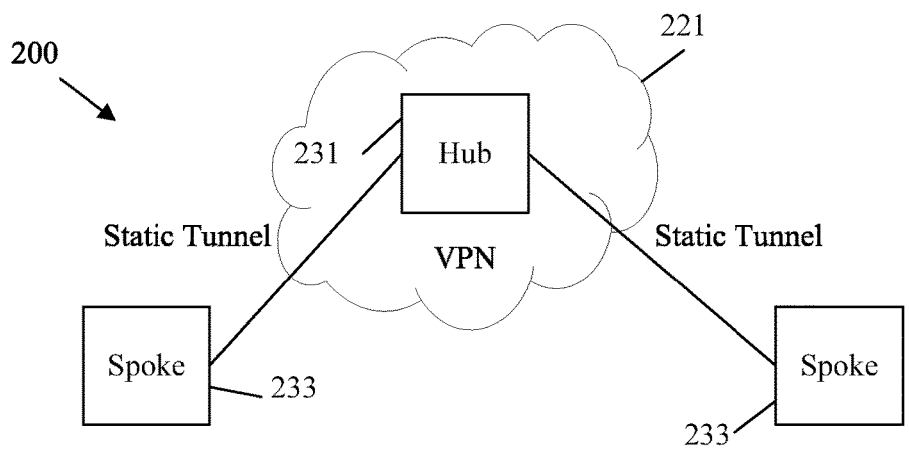
FIG. 2 is a schematic diagram of an example network employing a hub and spoke configuration to manage a VPN.

FIG. 2 is a schematic diagram of an example network 200 employing a hub 231 and spoke 133 configuration to manage a VPN 221. Specifically, network 200 displays a mechanism that can be employed to generate a VPN 221, which may be an example of a VPN 121. A hub 231, such as a PE 131, maintains a routing table with addresses of the nodes in the VPN 221. A spoke 233, such as a CPE 133, can join the VPN 221 by transmitting an enhanced next hop resolution protocol (NHRP) communication, such as a NHRP registration request, to the hub 231. The NHRP registration request contains the spokes 233 public internet protocol (IP) address and private tunnel address. The hub 231 employs an IGP to share such information with other hubs 231 and/or other spokes 233 in the VPN 221. Accordingly, the hubs 231 and spokes 233 can maintain a routing table with IP and tunnel addresses for the branch sites. Such information can be employed to setup the IPsec tunnels to maintain the VPN 221. In this example, a spoke 233 can join the VPN 221 by registering with any hub 231 so long as the hub 231 is already part of the VPN 221.

In network 200, the NHRP registration request only contains the address information for the spokes 233 and not for the branch site attached to the spoke 233. As such, VPN 221 terminates IPsec tunnels at the spokes 233 and cannot provide security all the way to workloads operating in the local network associated with the spoke 233. Further, in network 200, the spoke 233 joins the closest hub 231 on the VPN 221. However, when the spokes 233 are geographically distant, for example in separate countries or continents, the closest hub 231 on the VPN 221 may be distant from the spoke 233. Accordingly, the path from the spoke 233 to the hub 231 may traverse a large section of the public internet, which may provide unreliable communication resources. In scenarios where a carrier network PE that is not authenticated on the VPN 221 is physically close to the spoke 233, the communication could be improved substantially if the spoke 233 were to set up the path through the closer PE. However, the spoke 233 may be unaware of the existence of the closer PE because the closer PE is not in the VPN 221. In addition, employing IGPs to pass address information to all spokes 233 may lead to excessively large and inefficient routing tables when hundreds or thousands of spokes 233 (e.g., branch sites) have connected to the VPN 221.

Figure 3:
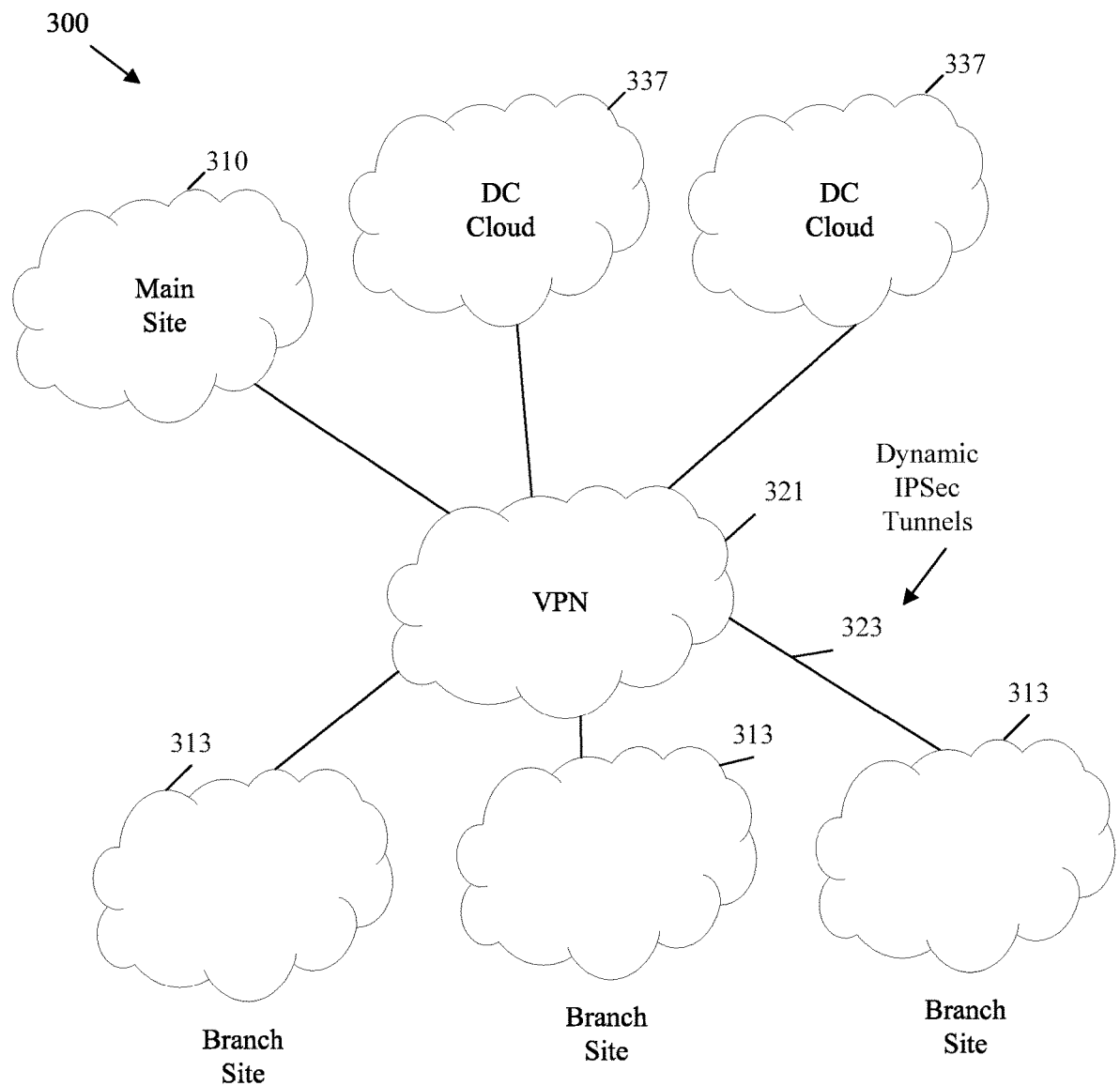
FIG. 3 is a schematic diagram of an example network employing a VPN to connect island networks via tunnels over uncontrolled networks.

FIG. 3 is a schematic diagram of an example network 300 employing a VPN 321 to connect island networks via tunnels over uncontrolled networks. The VPN 321 is similar to VPN 121 and/or 221, but employs dynamic IPsec tunnels 323. Specifically, network 300 includes branch sites 313 and a main site 310, which are similar to branch sites 111 and main site 110, respectively. Network 300 also includes DC clouds 337. DC clouds 337 may include third party cloud computing networks. A cloud computing network is a network of servers and networking components. A cloud computing network is configured to elastically provision hardware resources, such as processing cores, memory, and network bandwidth for applications on an as needed basis. Hardware resources can be allocated to a first application when the first application employs a high level of resources for a particular task, and then be reallocated to a second application when the first application no longer needs them. The DC clouds 337 are beneficial because they allow the main site 310 to offload processing tasks in a cost effective manner in comparison to maintaining a private DC at the main site 310. However, offloading processing tasks in this manner potentially creates security issues as the DC clouds 337 are owned and managed by a third party.

The VPN 321 employs the dynamic IPsec tunnels 323 to interconnect the branch sites 313, the main site 310, and the DC clouds 337. The dynamic IPsec tunnels 323 may be setup and controlled by a controller. The VPN 321 may operate over an MPLS network. Hence, the VPN 321 can provide quality communication services, SLA guarantees such as quality of service (QoS) guarantees, priority communications, bandwidth minimums, low latency, etc.

The difficulty in network 300 is that the branch sites 313, the main site 310, and/or DC clouds 337 may be separated from the VPN 321 by other uncontrolled networks, such as the public Internet. As such, the SLA cannot be guaranteed over the uncontrolled networks. Also, the dynamic IPsec tunnels 323 may create implementation difficulties. For example, the endpoints of the dynamic IPsec tunnels 323 may change dynamically. Accordingly, maintaining network 300 may present challenges when the endpoints of the IPsec tunnels 323 are not known and/or are positioned in locations that are difficult to reach via the carrier network operating the VPN 321.

Figure 4:
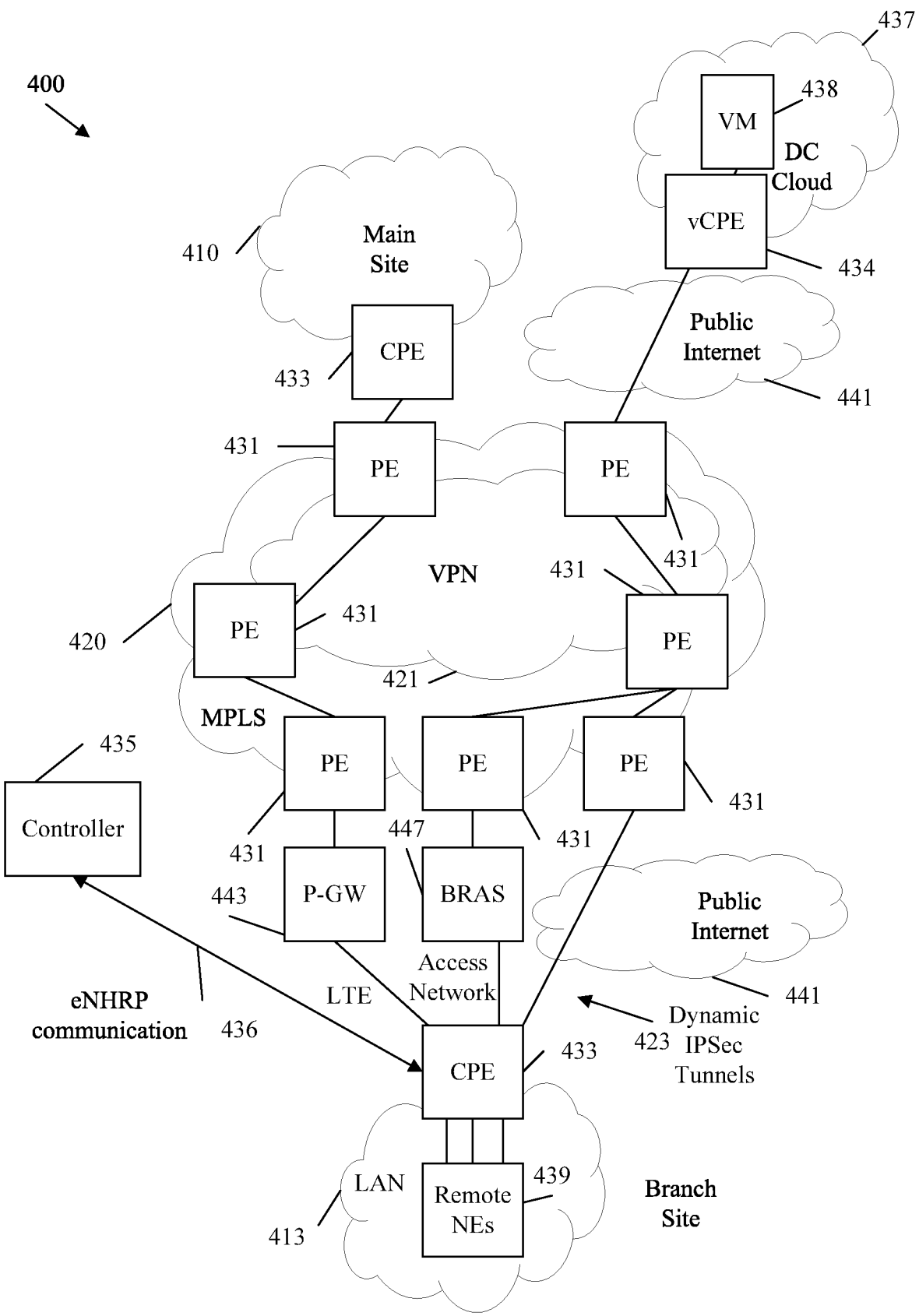
FIG. 4 is a schematic diagram of an example embodiment of a SDWAN employing a VPN to support asymmetric connections.

FIG. 4 is a schematic diagram of an example embodiment of a SDWAN 400 employing a VPN 421 to support asymmetric connections. SDWAN 400 overcomes and/or mitigates the concerns associated with the abovementioned networks. SDWAN 400 includes branch sites 413, a main site 410, and a DC cloud 437, which may be similar to branch sites 313, main site 310, and DC cloud 337, respectively.

The branch sites 413 employ a LAN to interconnect remote network elements (NEs) 439. The remote NEs 439 are computing devices, such as client machines (e.g., computers) that operate applications for users at the branch sites 413. The branch sites 413 also include a CPE 433 that is similar to a CPE 133, and acts as a communication gateway for the branch site 413 LAN. The main site 410 also employs a LAN of NEs 439 and communicates via a CPE 433.

The DC cloud 437 includes one or more VMs 438 to compute data for applications operating on NEs 439 at the main site 410 and the branch sites 413. A VM 438 is an emulation of a computer system created by elastically allocating hardware resources in the DC cloud 437 to the VM 438 to perform computational and communication tasks. The DC cloud 437 may include a CPE 433 or a virtual CPE (vCPE) 434 where a vCPE 434 is an emulation of a hardware CPE 433 created by elastically allocating hardware resources in the DC cloud 437 to the vCPE 434 to perform corresponding communication tasks. While only one DC cloud 437 is depicted, multiple DC clouds 437 may be employed. Further, processes may be dynamically moved between DC clouds 437 as desired to position processing resources geographically closer to areas of increased application usage, for example by the branch sites 413.

The DC cloud 437, branch sites 413, and main site 410 are connected by a carrier network 420. The carrier network 420 includes a network of interconnected nodes, such as routers, switches, etc. that transport communications between other networks. The carrier network 420 may be an electrical network, an optical network, an electro-optical network, etc. The carrier network 420 includes a plurality of PE 431 devices positioned at the edges of the carrier network 420. The PEs 431 may be similar to PEs 131. The PEs 431 are interconnected via the carrier network 420. Further, the carrier network 420 may communicate data between the PEs 431 via an MPLS protocol by setting up label switched pathways through the carrier network 420. The PEs 431 are configured to connect traffic from the DC cloud 437 network, the main site 410 network (e.g., a headquarter network for an enterprise), and branch sites 413 that include networks that are remote from the main site 410, for example via MPLS pathways through the carrier network 420. As the branch sites 413 are geographically distant (e.g., potentially in different states, countries, and/or continents) from the main site 410, the network can be considered a wide area network (WAN). A WAN is a network that connects devices over tens, hundreds, or thousands of miles.

The carrier network 420 may not be dedicated to any particular enterprise, and hence communicates traffic for third parties other than the enterprise operating at the main site 410. A VPN 421 is employed to partition communication resources in the carrier network 420 for use by the enterprise operating at the main site 410 and the branch sites 413. Accordingly, the VPN 421 is configured to securely communicate the traffic between the DC cloud 437 network, the main site 410, and the remote networks at the branch sites 413. The VPN 421 is an allocated set of communication resources that are private and hence only accessible by network devices that are authenticated onto the VPN 421. The resource allocation to the VPN 421 may be dynamically changed by a controller 435. Hence, the VPN 421 implements a SDWAN, which is a WAN implemented by communication resources that are dynamically and programmatically allocated, for example by software operating on the controller 435. As shown, at any given time, some PEs 431 in the carrier network 420 are authenticated onto (e.g., connected) to the VPN 421 while other PEs 431 are not. As with the VPNs discussed above, VPN 421 may be implemented by establishing IPsec tunnels 423 across the MPLS network. The IPsec tunnels 423 may be established dynamically by the controller 435. Hence, the IPsec tunnels 423 can be created and terminated programmatically upon the occurrence of predefined conditions without direct administrator/user interaction.

As shown, some of the branch sites 413, the DC cloud 437, and/or even the main site 410 may be separated from the carrier network 420 by uncontrolled third party networks, such as the public Internet 441. As such, the branch sites 413, the DC cloud 437, and/or the main site 410 may be connected to the carrier network 420 by the VPN 421 via the third party network by employing the IPsec tunnels 423.

The resource allocation for the VPN 421 and the IPSec tunnels 423 are handled by a controller 435, which may be an SDN controller. A controller 435 is a hardware component configured to programmatically allocate network resources upon the occurrence of predefined conditions. Specifically, a controller 435 may manage data flow control at the switch and router level as well as operate network control applications that determine dynamic communication needs for the main site 410, branch sites 413, and DC cloud 437. Hence, the controller 435 maintains a view of network resource allocations for the VPN 421 in the carrier network 420 as well, a view of the IPsec tunnels 423, and an understanding of dynamic network communication usage and prospective needs. The controller 435 may be physically positioned within the carrier network 420 to maintain awareness of the current network resource allocations.

Upon preparing to connect to the SDWAN 400, the CPEs 433 communicate with the controller 435 via enhanced next hop resolution protocol (eNHRP) communications 436. Specifically, the CPE 433 attaches a CIE to an eNHRP communication 436. The CIE provides the controller 435 with network address information for the remote NEs 439 and/or the LAN at the branch site 413, VMs 438 at the DC cloud 427, and/or NEs 439 at the main site 410, depending on the example. For example the eNHRP communication 436 CIE may contain client virtual network identifiers, tunnel identifiers, private local addresses, and/or public IP addresses of a connection destination. The eNHRP communication 436 may include an eNHRP registration and/or an eNHRP resolution request. The eNHRP registration request is a request to register network address information related to the LAN/NEs with the controller 435. The eNHRP resolution request is a request to determine (resolve) a connection point (next hop) into the VPN 421. The eNHRP communication 436 may also indicate whether a branch site 413 wants to connect to a single PE 431 or multiple PEs 431 in an asymmetric manner. The eNHRP communication 436 also includes an eNHRP resolution reply from the controller 435 to the relevant CPE 433. The eNHRP resolution reply contains connection instructions based on the information in the CIE.

The information from the CIE allows the controller 435 to implement several functions. For example, the controller 435 can employ the private IP addresses to create IPsec tunnels 423 to the remote NEs 439, VMs 438, and/or NEs 439 at the main site 410. Accordingly, security can be provided in an end-to-end fashion instead of stopping at the CPEs 433. This is particularly beneficial for providing security across the DC cloud 437 to the VMs 438 performing processing tasks, as the DC cloud 437 network may be operated by a third party that is not controlled by the enterprise at the main site 410 or the entity operating the carrier network 420. This approach may also offload some of the burden of managing the IPsec tunnels 423 from the CPEs 433, which may be overburdened in other network architectures that employ large numbers of branch sites 413. Also, this information can be employed to allow the remote NEs 439, VMs 438, and/or NEs 439 at the main site 410 to connect to a subnet or other virtual network that is a subset of the VPN 421 instead of requiring all nodes connect to the entire VPN 421. As such, connections can be made without IGPs and the VPN 421 can be setup using less than a full mesh. When a full mesh is avoided, the complexity of the network may not increase exponentially with each new node added to the network. Accordingly, the SDWAN 400 can scale to hundreds and/or thousands of branch sites 413 in a reliable manner.

In addition, the CIE information can support asymmetric connections between the CPE 433 and the carrier network 420. For example, some CPEs 433 may contain multiple interfaces, such as a wireless LTE interface, an interface onto an access network that couples to the carrier network 420, an interface that couples to the public Internet 441, etc. Such interfaces may include wireless interfaces, electrical interfaces (e.g., digital subscriber line (DSL), coaxial connection), optical interfaces (e.g., optical fiber), and/or electro-optical interfaces. The CIE information can request multiple PEs 431, and the response/reply from the controller 435 can indicate PEs 431 associated with different CPE 433 interfaces. The CPE 433 can then establish an asymmetric connections with the PEs 431, where asymmetric connections are related network connections that employ different connection media, and hence may operate with different latency, bandwidth, QoS, etc. Specifically, asymmetric connections are related connections that couple a CPE 433 to a VPN 421 via multiple unrelated paths, for example via different access networks. As an illustrative example, a group of asymmetric connections may include one or more tunnel based connections and one or more connections that do not employ tunnels. As another illustrative example, a group of asymmetric connections may include one or more electrical connections and one or more optical connections. As another illustrative example, a group of asymmetric connections may include one or more wired connections and one or more wireless connections. As another illustrative example, a group of asymmetric connections may include one or more coaxial connections and one or more digital subscriber line (DSL) connections. As another illustrative example, a group of asymmetric connections may include one or more cellular connections and one or more Institute of Electrical and Electronics Engineers (IEEE) 802.11 wireless connections. As another illustrative example, a group of asymmetric connections may include a combination of the previously describe illustrative examples.

Accordingly, the CPE 433 and controller 435 can interact to create asymmetric connections so that different remote NEs 439 at the branch sites 413 and/or different applications operating at the branch sites 413 can be provided with varying levels of communication service. As a specific example, the CPE 433 can create a first connection to a PE 431 in the carrier network 420 via an LTE interface through a packet data network gateway (P-GW) 443, which is a mobility anchor between third generation partnership project (3gpp) and non-3gpp communication technologies. The CPE 433 can also create a second connection to a second PE 431 in the carrier network 420 via an access network through a broadband remote access server (BRAS) 447, which is a device configured to route data between an internet service provider (ISP) network and a core network, such as the carrier network 420. The CPE 433 can also create a third connection to a third PE 431 in the carrier network 420 via an available connection to the public internet 441.

Also, as shown, some PEs 431 may be authenticated onto the VPN 421, while other PEs 431 are not. The controller 435 can employ the CIE information to direct the CPE 433 to connect to the PE(s) 431 that are physically closest to the branch site 413 instead of connecting to the nearest PE 431 that is also connected to the VPN 421. This can make a significant difference when the closest PE 431 is in the same country/continent as the branch site 413 while the nearest PE 431 that is also connected to the VPN 421 is in a different country/continent. The PE 431 that is not connected to the VPN 421 can still provide SLA for the communication, for example by providing bandwidth, latency, and/or QoS guarantees. Such guarantees are not available across uncontrolled networks, and hence connecting to the nearest PE 431 that is also connected to the VPN 421 may result in a significant portion of the connection traversing an area where SLA cannot be provided. As such, the controller 435 can direct the CPE 433 to connect to the nearest VPN 421 connected PE 431 via the nearest PE 431 for increased overall communication quality.

In some examples, the controller 435 can indicate multiple PEs 431 in proximity to the requester. The CPE 433 at the island-site can use various measurement tools to select the most optimal PE 431 for traffic to different sites that are attached to the VPN 421. In another example, the controller 435 can send a preferred PE 431 to the branch site 413 CPE 433 as the controller 435 is equipped to measure which PE 431 has the shortest latency, highest QoS, or sufficient communication resources to the branch site 413 CPE 433.

The abovementioned functionality can be accomplished via the eNHRP communications 436 between the controller 435 and the requesting CPE 433. As a specific example, the CPE 433 may be preconfigured with the address of the controller 435, the CPE's 433 own public IP address, and the CPE's 433 own tunnel endpoint to the VPN 421. When CPE 433 is instantiated, the CPE 433 sends an eNHRP registration request with CIEs for the clients in the associated LAN. The eNHRP registration request can also be sent periodically to prevent expiration. The CIE includes the attached clients' (e.g., remote NEs 439) private addresses, their corresponding virtual network identifiers for the VPN 421, and associated tunnel identifiers to the controller 435. In order to isolate traffic from different clients, the requesting CPE 433 can request to establish multiple tunnels with the desired peers, which can be hub or other spoke nodes.

The controller 435 is configured to receive the eNHRP registration request from the CPE 433 in the remote network. Accordingly, the controller 435 also receives CIEs that indicate client's local private addresses, network identifiers, and tunnel identifiers. The controller 435 stores the information and transmits an eNHRP registration response to indicate that the eNHRP registration request has been received. The CPE 433 then sends an eNHRP resolution request. In some examples, the eNHRP resolution request may contain a code requesting PE 431 devices be selected with minimized exposure to a public internet 441. This indicates the CPE 433 is requesting address(es) of the closest PEs 431 and not the closest PEs 431 that are also connected to the VPN 421. In some examples, the eNHRP resolution request may also contain a preference that multiple PEs 431 be selected to support asymmetric connections.

The controller 435 can then calculate routes through the carrier network 420 based on the eNHRP resolution request parameters, the stored CIE information for the requesting branch site 413, the current network resource allocation for the VPN 421, the relevant tunnel endpoints, and the available network resources in the carrier network 420. For example, the controller 435 may employ the client local addresses in the branch site 413 network to determine IPsec tunnel 423 endpoints that directly connect the clients in the branch site 413 remote network to the VM 438 via the VPN 421. The controller 435 may also calculate IPsec tunnels 423 that traverse multiple PEs 431, connect some clients to a subset of nodes on the VPN 421, etc.

Once the calculations are complete, the controller 435 provides an eNHRP resolution reply to the CPE 433 at the remote network. In some examples, the eNHRP resolution reply indicates one or more PE(s) 431 for connection to the MPLS network that are selected based on geographic distance to the remote network and not based on PE 431 attachment to the VPN 421. In such a case, the eNHRP resolution reply may contain a code indicating the PEs 431 have been selected with minimized exposure to a public internet 441. In some examples, the eNHRP resolution reply indicates multiple PEs 431 to support establishment of a plurality of asymmetric connections to the VPN 421 via the PE devices 431. In still other examples, the eNHRP resolution reply indicates IPsec tunnel 423 endpoints that allow the remote network to connect client(s) to some but not all nodes in the VPN 421. In still other examples, the eNHRP resolution reply indicates IPsec tunnel 423 endpoints that allow clients/servers in the branch site 413/DC cloud 437 to directly connect to the VPN 421 instead of employing the CPE 433 as the endpoint. The CPE 433 can then either establish the IPsec tunnels 423 directly or provide the information to the relevant remote NEs 439/VMs 438, which then establish the IPsec tunnels 423.

There are two general scenarios when selecting PEs 431 in close proximity to the CPE 433. In a first scenario, the branch site 413 is aware of which remote sites that locally attached clients/workload wish to communicate with. Those remote sites can be directly attached to the VPN 421 or reachable via the public internet 441. For example, the communication peers can be statically configured on the branch site 413 in some cases. Under this circumstance, the branch site 413 communicates peers' destination public addresses in an eNHRP resolution request. The response from the controller 435 then includes the tunnel 423 addresses and the address of VPN 421 PEs 431 that are in close proximity to the requester.

In a second scenario, the branch site 413 is not aware of which remote sites that locally attached clients/workload should communicate with. Under this circumstance, the branch site 413 should communicate the destination private address in the eNHRP resolution request. The response from the controller 435 then includes not only the remote sites' public IP addresses and tunnel addresses, but also the PEs 431 that are in close proximity to the requester.

The embodiments discussed hereinabove are accomplished by employing various eNHRP messages. The following section provides example encodings to implement such messages.

Figure 5:
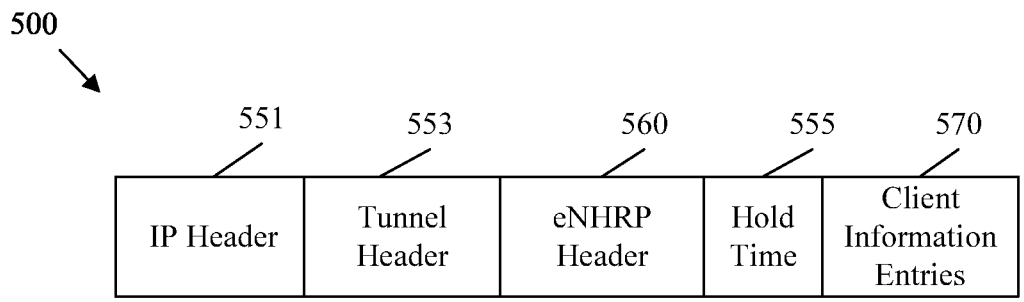
FIG. 5 is a schematic diagram of an example enhanced next hop resolution protocol (eNHRP) registration request.

FIG. 5 is a schematic diagram of an example eNHRP registration request 500, which may be employed as an eNHRP communication 436. The eNHRP registration request 500 may be transmitted from a CPE to a SDN controller when the CPE is instantiated (e.g., powered on) in order to provide network information regarding clients, VMs, and/or other nodes operating in a LAN that should be connected to an SDWAN via a VPN. The eNHRP registration request 500 may also be transmitted periodically in order to refresh the corresponding information at the controller. The eNHRP registration request 500 includes an IP header 551, a tunnel header 553, an eNHRP header 560, a hold time 555, and one or more CIEs 570.

The IP header 551 includes the source public IP address of the CPE and the destination IP address of the controller. The IP header 551 is employed to route the eNHRP registration request 500 from the CPE to the controller. The tunnel header 553 is employed to route the eNHRP registration request 500 to the controller via an established tunnel. The tunnel header 553 may include tunnel endpoints and act to encapsulate the eNHRP registration request 500 according to generic routing encapsulation (GRE) or Virtual Extensible LAN (VxLAN) protocols.

Figure 6:
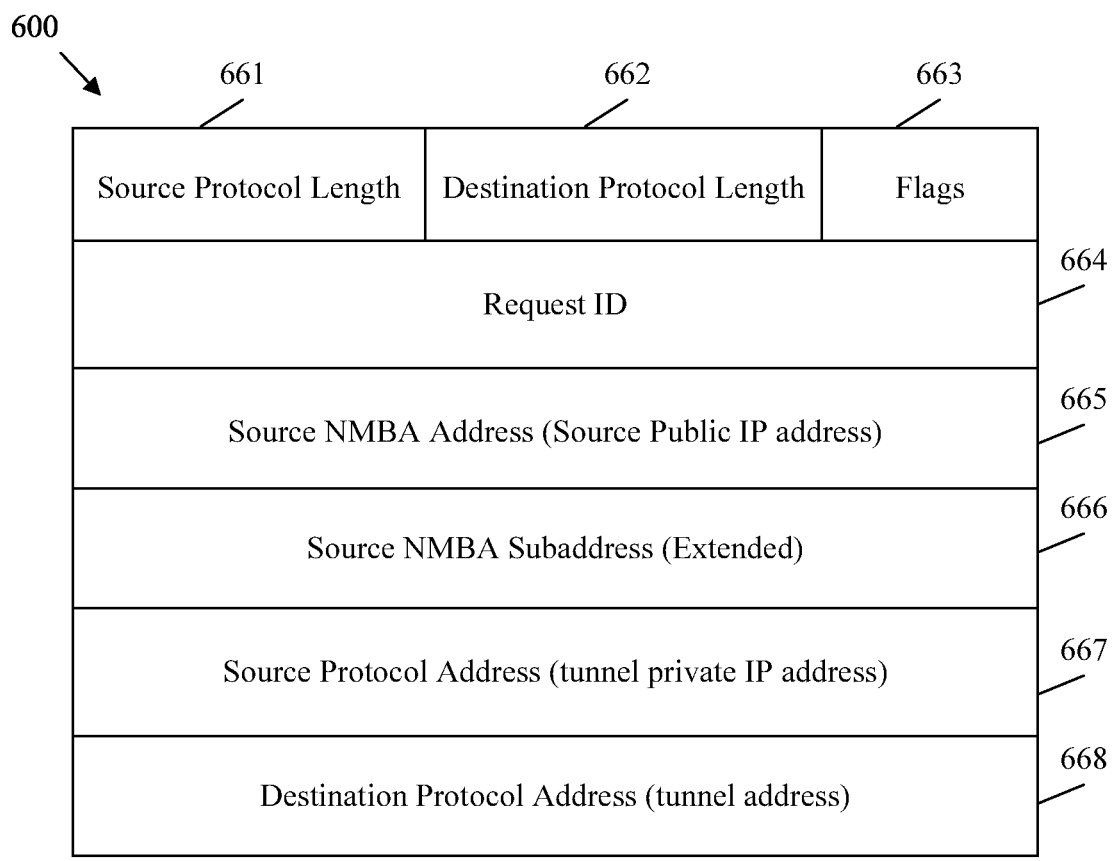
FIG. 6 is a schematic diagram of an example eNHRP registration request header.
Figure 6:
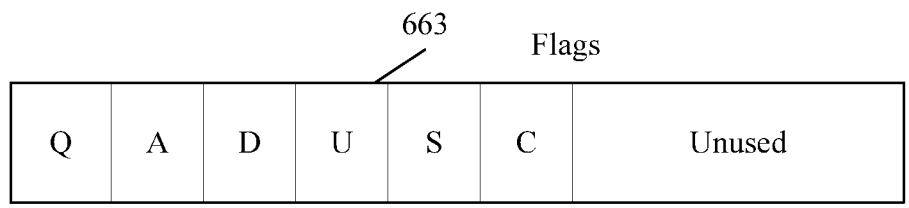

The eNHRP header 560 is employed to indicate the IP address and tunnel addresses related to the CPE. The IP header 551 can also be employed to indicate that at least some attached clients/subnets should not be completely connected to all nodes in the VPN. An example of the eNHRP header 560 is depicted in FIG. 6 below. The hold time 555 indicates a time that the information contained in the eNHRP registration request 500 should expire. Hence, a new eNHRP registration request 500 may be sent prior to the end of the hold time 555 to keep the information at the controller from expiring.

Figure 7:
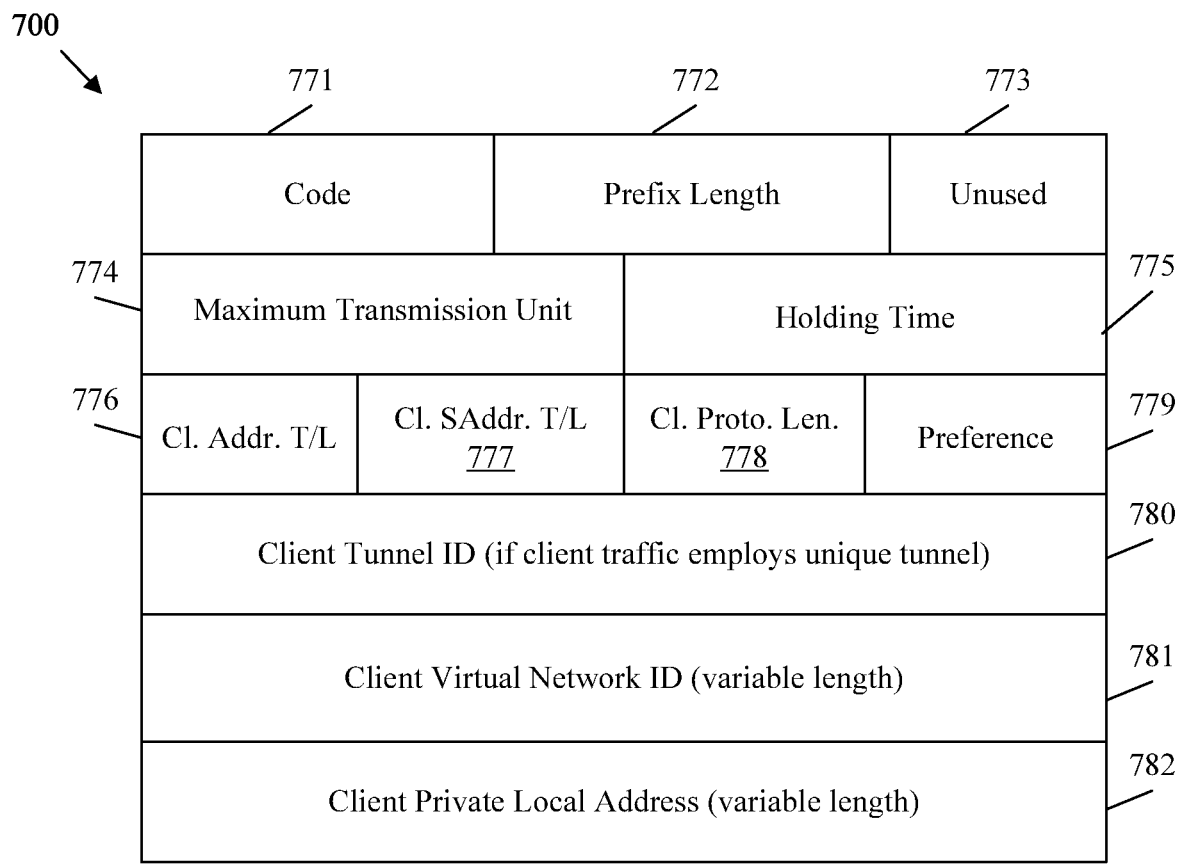
FIG. 7 is a schematic diagram of an example client information entry (CIE).

The CIEs 570 contain information indicating clients/subnets that should be partially connected to nodes in the VPN. The CIEs 570 also contain information indicating tunnel IDs, virtual network IDs, and/or private local addresses for clients in networks attached to the CPE. An example of a CIE is depicted in FIG. 7 below.

FIG. 6 is a schematic diagram of an example eNHRP registration request header 600, which may be employed as an eNHRP header 560 in an eNHRP registration request 500 sent in an eNHRP communication 436. The eNHRP registration request header 600 includes a source protocol length field 661, a destination protocol length field 662, a flags field 663, a request ID field 664, a source non-broadcast multi-access (NMBA) address field 665, a source NMBA subaddress field 666, a source protocol address field 667, and a destination protocol address field 668.

The source protocol length field 661 may be eight bits long, may extend from bit zero to bit seven, and may indicate the length, in octets, of the source protocol address, which is the public IP address of CPE sending the eNHRP registration request 500. The destination protocol length field 662 may be eight bits long, may extend from bit eight to bit fifteen, and may indicate the length, in octets, of the destination protocol address, which is the IP address of the controller.

The flags field 663 may be sixteen bits long, may extend from bit sixteen to bit thirty one, and may indicate flags that are specific to the message. The flags field 663 may include a C flag at the twenty first bit position. The C flag is set, to indicate that an edge (or spoke) node does not wish to run a routing protocol with other peers, and that the attached private addresses (subnets) are indicated in the CIE. Accordingly, the C flag indicates that at least one of the nodes/clients in the CIE should not be attached to all nodes in the VPN.

The request ID field 664 may be thirty two bits long, may extend from bit zero to bit thirty one, and may include a unique ID for the eNHRP registration request 500. The value is copied into the eNHRP registration response to allow the CPE to match the response to the request. The source NMBA address field 665 may be thirty two bits long, may extend from bit zero to bit thirty one, and may include the public IP address of CPE sending the eNHRP registration request 500. The source NMBA subaddress field 666 may be thirty two bits long, may extend from bit zero to bit thirty one, and may include an extension, if any, to the public IP address of the CPE sending the eNHRP registration request 500.

The source protocol address field 667 may be thirty two bits long, may extend from bit zero to bit thirty one, and may include a IPsec tunnel private IP address of the CPE sending the eNHRP registration request 500. The destination protocol address field 668 may be thirty two bits long, may extend from bit zero to bit thirty one, and may include the destination tunnel address associated with the controller.

FIG. 7 is a schematic diagram of an example CIE 700, which may be employed as a CIE 570 in an eNHRP registration request 500 sent in an eNHRP communication 436. The CIE 570 describes a single client in a branch site 413, a main site 410, and/or a DC cloud 437. Hence, a eNHRP registration request 500 may include multiple CIEs 700. The CIE 700 includes a code field 771, a prefix length field 772, unused bits 773, a maximum transmission unit field 774, a holding time field 775, a client address type and length field 776, a client sub-address type and length field 777, a client protocol length field 778, a preference field 779, a client tunnel ID field 780, a client virtual network ID field 781, and a client private local address field 782.

The code field 771 may be eight bits long, may extend from bit zero to bit seven, and may be set to indicate that the client address in the CIE 700 entry should remain locally attached to the CPE instead of attaching directly to the VPN via an IPsec tunnel. Hence, the code field 771 may indicate whether the client should be completely attached to the entire VPN via attachment to the CPE or directly attached to a particular subnet of the VPN.

The prefix length field 772 may be eight bits long, may extend from bit eight to bit fifteen, and may be set to indicate that the CIE 700 applies to a subnet of clients or set to zero to indicate the CIE 700 applies to a specific client. The unused bits 773 may be sixteen bits long, may extend from bit sixteen to bit thirty one, and may unused/reserved for other purposes. The maximum transmission unit field 774 may be sixteen bits long, may extend from bit zero to bit fifteen, and may be set to indicate a maximum transmission unit length employed by the associated client. The holding time field 775 may be sixteen bits long, may extend from bit sixteen to bit thirty one, and may be set to indicate a number of seconds that the CIE 700 information is valid.

The client address type and length field 776 may be eight bits long, may extend from bit zero to bit seven, and may be set to indicate the type and length of the client tunnel ID field 780. The client sub-address type and length field 777 may be eight bits long, may extend from bit eight to bit fifteen, and may be set to indicate the type and length of the client virtual network ID field 781. The client protocol length field 778 may be eight bits long, may extend from bit sixteen to bit twenty three, and may be set to indicate the length of the client private local address field 782. The preference field 779 may be eight bits long, may extend from bit twenty four to bit thirty one, and may be set to indicate a preference for usage of the CIE 700 relative to other CIEs (e.g., a priority).

The client tunnel ID field 780 may be of a variable length may be set to indicate a client IPsec tunnel ID when the client employs a unique tunnel for network traffic. The client virtual network ID field 781 may be of a variable length may be set to indicate a client virtual network ID in the VPN. The client private local address field 782 may be of a variable length may be set to indicate the private local address of the client on the LAN connected to the CPE. Hence, the client tunnel ID field 780, the client virtual network ID field 781, and the client private local address field 782 may be employed to indicate address information related to the client and/or groups of clients on the LAN, which may be employed to directly connect clients to the VPN via IPsec tunnels and/or to connect sub-groups of clients to sub-nets of the VPN.

Figure 8:
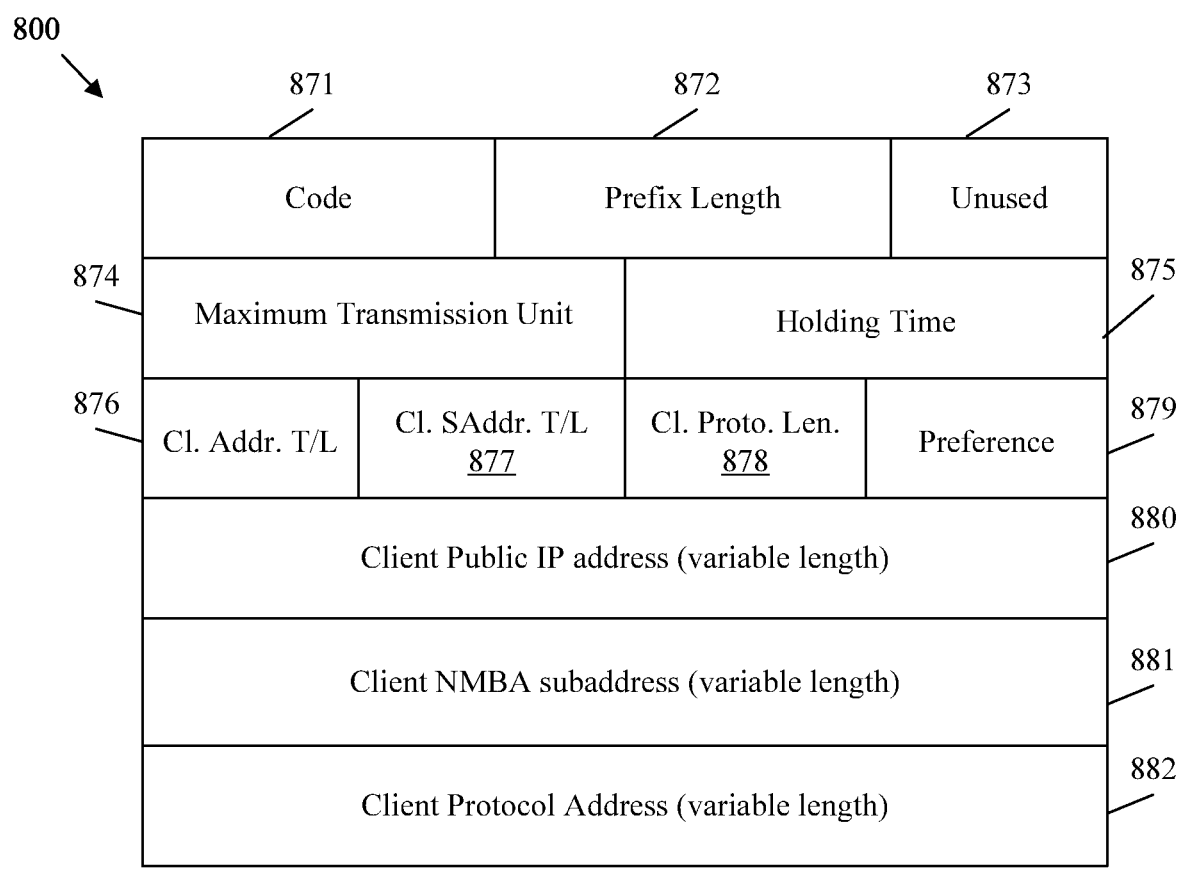
FIG. 8 is a schematic diagram of an example eNHRP resolution request.

FIG. 8 is a schematic diagram of an example eNHRP resolution request 800, which may be employed as an eNHRP communication 436. Specifically, the eNHRP resolution request 800 may be sent by a CPE to a controller to request the controller to suggest PE(s) that the CPE and/or associated clients can connect to join the VPN and/or the associated SDWAN. The eNHRP resolution request 800 includes a code field 871, a prefix length field 872, unused bits 873, a maximum transmission unit field 874, a holding time field 875, a client address type and length field 876, a client sub-address type and length field 877, a client protocol length field 878, a preference field 879, a client public IP address field 880, a client NMBA sub-address field 881, and a client protocol address field 882, which are similar to code field 771, prefix length field 772, unused bits 773, maximum transmission unit field 774, holding time field 775, client address type and length field 776, client sub-address type and length field 777, client protocol length field 778, preference field 779, client tunnel ID field 780, client virtual network ID field 781, and client private local address field 782, respectively. The fields of eNHRP resolution request 800 may indicate a corresponding CPE for a LAN or for a client/VM. Further differences are as follows.

The code field 871 may be set to indicate that the requester is requesting selection of PE(s) closest to the island/branch site so that a tunnel can be established with minimal exposure to public internet. Accordingly, code field 871 can be employed to attach a CPE/client to the geographically closest PE instead of the closest PE that is also part of the VPN. The preference field 879 may be set to indicate that the requester is requesting multiple PEs, which allows the requester to choose a PE and/or allows the requester to setup multiple asymmetric connections via multiple PEs. The client public IP address field 880 contains the public IP address of the requesting client. The client NMBA sub-address field 881 contains a non-broadcast multi-access sub-address for the requesting client. The client protocol address field 882 contains an internetworking layer address for the requesting client.

Figure 9:
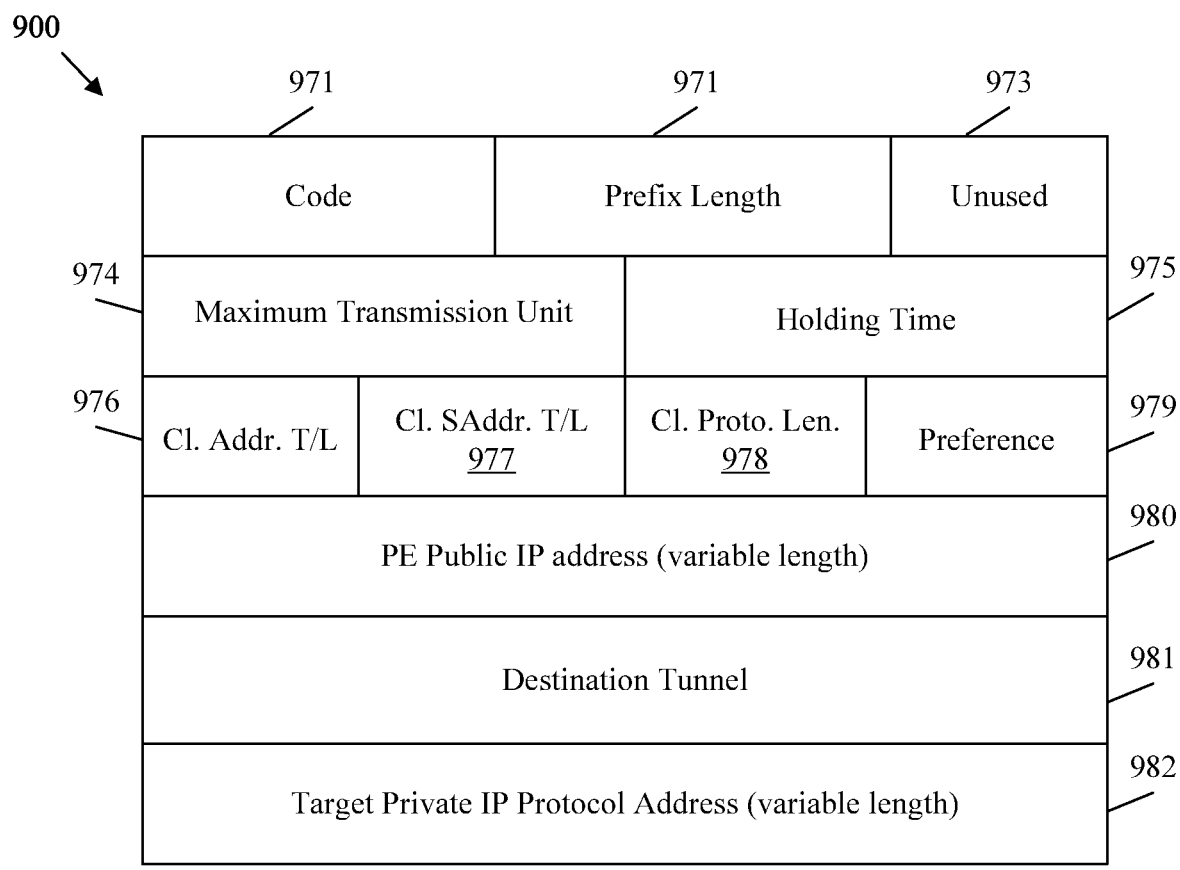
FIG. 9 is a schematic diagram of an example eNHRP resolution reply.

FIG. 9 is a schematic diagram of an example eNHRP resolution reply 900, which may be employed as an eNHRP communication 436. Specifically, the eNHRP resolution reply 900 may be sent by a controller to a CPE in response to an eNHRP resolution request 800. Hence, the eNHRP resolution reply 900 may indicate address information for PEs to which a client and/or CPE can connect to gain access to the VPN, a VPN subnet, and/or the SDWAN. The eNHRP resolution reply 900 includes a code field 971, a prefix length field 972, unused bits 973, a maximum transmission unit field 974, a holding time field 975, a client address type and length field 976, a client sub-address type and length field 977, a client protocol length field 978, a preference field 979, a PE public IP address field 980, a destination tunnel address field 981, and a target private IP protocol address field 982, which are similar to code field 771, prefix length field 772, unused bits 773, maximum transmission unit field 774, holding time field 775, client address type and length field 776, client sub-address type and length field 777, client protocol length field 778, preference field 779, client tunnel ID field 780, client virtual network ID field 781, and client private local address field 782, respectively. The eNHRP resolution reply 900 fields are employed to indicate a PE in response to eNHRP resolution request 800. Multiple sets of eNHRP resolution reply 900 fields can be employed to indicate multiple PEs. Other differences are as follows.

The code field 971 may be set to indicate that the indicated PE is selected for the island/branch site to establish an IPsec tunnel with minimal exposure to public internet. Accordingly, code field 971 can be employed to attach a CPE/client to the geographically closest PE instead of the closest PE that is also part of the VPN. The PE public IP address field 980 contains the public IP address of the indicated PE. The destination tunnel address field 981 contains a destination tunnel endpoint at the PE. The target private IP protocol address field 982 contains the private IP address for the indicated PE.

Figure 10:
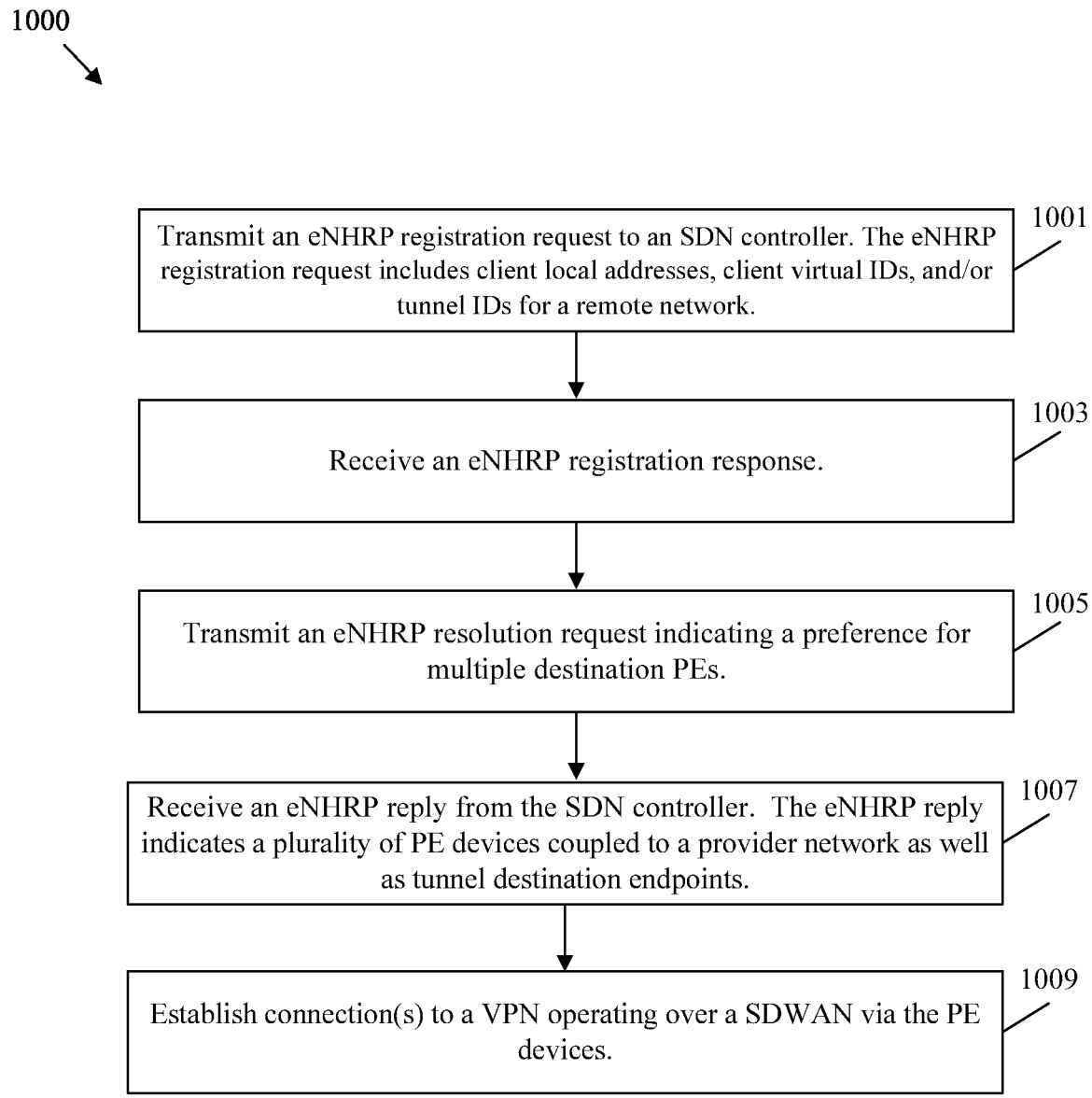
FIG. 10 is a flowchart of an example method for employing a CPE to asymmetrically connect to a SDWAN employing a VPN.

FIG. 10 is a flowchart of an example method 1000 for employing a CPE, such as CPE 433, to asymmetrically connect to a SDWAN employing a VPN, such as SDWAN 400 and VPN 421, respectively. Specifically, method 1000 employs eNHRP communications, such as an eNHRP registration request, an eNHRP resolution request, and/or an eNHRP resolution reply, which may employ example encodings as depicted and described with reference to FIGS. 5-9. Method 1000 describes such a process from the perspective of a CPE at a branch site, but may also be employed by a CPE/vCPE in a DC cloud and/or a CPE at a main site in some examples. Method 1000 may be implemented when a CPE is instantiated/powered on and/or when a branch site determines to add or change a communication.

At block 1001, the CPE transmits an eNHRP registration request to an SDN controller. The eNHRP registration request is sent to inform the controller of network information associated with the CPE and/or with devices attached to the CPE via a LAN or other network. The eNHRP registration request includes client information entries that indicate client local addresses, client virtual network identifiers, tunnel identifiers, or combinations thereof, to the SDN controller. The eNHRP registration request may also contain a flag and corresponding codes in the CIEs to indicate client(s) that should be connected to a subset of the VPN instead of the entire VPN.

At block 1003, an eNHRP registration response is received from the controller at the CPE. The eNHRP registration response functions as an acknowledgement and indicates that registration at block 1001 is successful. The eNHRP registration request may include a hold time. Hence, blocks 1001 and 1003 may be repeated periodically to maintain network information associated with the CPE and branch site at the controller.

At block 1005, the CPE transmits an eNHRP resolution request to the SDN controller. The eNHRP resolution request is a request to determine a connection point (next hop) into the VPN. In some cases, the resolution request may contain a code requesting that a PE device or devices be selected by the CPE, where a connection to such PE devices has minimized exposure to the public internet. Specifically, such a code indicates that the PE(s) returned by the controller should be positioned in a close geographic position to the CPE, to the extent possible, so that the resulting connection has the fewest number of links/nodes possible that traverse a third party network, such as the public internet. Further, the resolution request may indicate a client address, such as a public IP address, for a target client attached to the CPE. In this case, the resolution request indicates the SDN controller should select a PE device to connect the target client to the VPN, for example via an IPsec tunnel. This allows the CPE to request that the client or client(s) be directly connected to the VPN and hence act as endpoint(s) for the corresponding IPsec tunnels. This also removes the burden of some tunnel management from the CPE and shifts the burden to the client. The eNHRP resolution request may also contain a preferences field to indicate that the CPE and/or corresponding clients would like to receive multiple PEs instead of a single PE. This allows the CPE/client to select a PE. This also allows the CPE/client to establish multiple asymmetric connections.

The SDN controller receives the eNHRP resolution request and selects PE(s) as next hops for the CPE/clients based on the information from the eNHRP resolution request as well as the information previously received (and stored) in the eNHRP registration request. The selected PE(s) are then transmitted from the controller to the CPE in an eNHRP resolution reply at block 1007. The PE(s) are noted by public IP address, private IP address, and/or by a tunnel end point identifier. Accordingly, the CPE receives the eNHRP resolution reply from the SDN controller. The eNHRP resolution reply contains a plurality of PE devices coupled to the carrier network when the eNHRP resolution request requests multiple PEs at block 1005. The eNHRP resolution reply may also contain a code indicating that the included PE or PEs are associated with a connection with minimized exposure to a public internet when such a request is made in the eNHRP resolution request. In some cases, this may indicate that the signaled PE(s) are coupled to the provider network and not coupled to/authenticated into the VPN. Accordingly, the requestor can connect to another PE in the VPN via the signaled PE.

At block 1009, the CPE and/or clients can establish one or more connections to a VPN operating over a SDWAN via the PE devices indicated in the eNHRP resolution reply. For example, the CPE/clients can establish a plurality of asymmetric connections to the VPN when multiple PEs are included in the eNHRP resolution reply. For example, the asymmetric connections may include a wireless connection, an access network connection, a public internet connection, or combinations thereof. Further, establishing the connections between the CPE/clients may not establish a full mesh of connections with all devices connected to the VPN. As noted above, this may occur when the eNHRP registration request of block 1001 indicates that the corresponding CPE/client(s) should be connected to a subset of the VPN instead of the entire VPN. In addition, the CPE/clients may establish a connection with a PE with minimized exposure to the public Internet by establishing a connection with the closest PE that is coupled to the carrier network and not the closest PE that is coupled to both the carrier network and the VPN. Also, the CPE can forward the relevant information to the local clients attached to the CPE to allow the clients to establish tunnel connection(s) directly from the local clients to destinations coupled to the VPN/SDWAN. For example, this includes establishing a tunnel from the client to the PE and not establishing a tunnel from the CPE to the PE.

Figure 11:
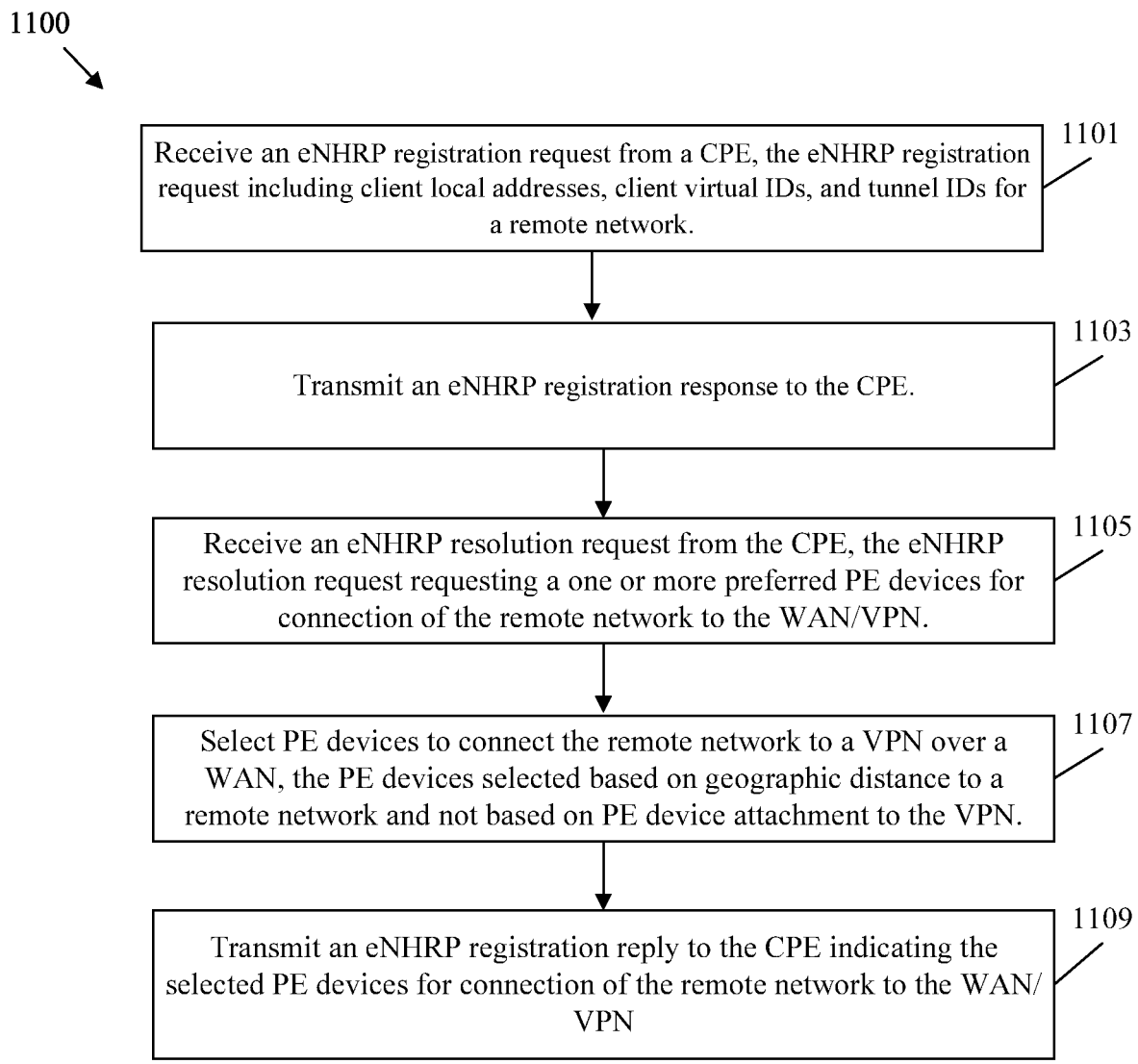
FIG. 11 is a flowchart of an example method for operating an SDN controller in a SDWAN employing a VPN.

FIG. 11 is a flowchart of an example method 1100 for operating an SDN controller, such as controller 435, in a SDWAN, such as SDWAN 400, employing a VPN, such as VPN 421. Method 1100 is similar to method 1000, but is expressed from the point of view of the controller. Hence, method 1100 employs eNHRP communications, such as an eNHRP registration request, an eNHRP resolution request, and/or an eNHRP resolution reply, which may employ example encodings as depicted and described with reference to FIGS. 5-9.

At block 1101, an SDN controller receives an eNHRP registration request from a network device, such as a CPE at a branch site or a CPE/vCPE at a cloud network. The eNHRP registration request informs the controller of network information associated with the CPE and/or with devices attached to the CPE, such as NEs, VMs, etc. The eNHRP registration request includes CIEs that indicate client local addresses of client nodes sharing a local area network with the CPE. The eNHRP registration request CIEs may also include client virtual network identifiers and/or tunnel identifiers for the devices attached to the CPE. In some cases, the eNHRP registration request may also contain a flag and corresponding codes in the CIEs, where the flag/codes indicate client(s) that should be connected to a subset of the VPN instead of the entire VPN.

At block 1103, the controller processes the eNHRP registration request by storing the relevant CIEs in memory and transmitting an eNHRP registration response to the CPE. The eNHRP registration response functions as an acknowledgement and indicates that registration at block 1103 is successful. The eNHRP registration request may include a hold time. Hence, blocks 1101 and 1103 may be repeated periodically to maintain network information associated with the CPE and branch site at the controller.

At block 1105, controller receives an eNHRP resolution request from the CPE. The eNHRP resolution request is a request to determine a connection point (next hop) from the CPE and/or connected clients into the VPN. In some cases, the resolution request may contain a code requesting that a PE device or devices be selected by the CPE, where a connection to such PE devices has minimized exposure to the public internet. Specifically, such a code indicates that the PE(s) returned by the controller should be positioned in a close geographic position to the CPE, to the extent possible, so that the resulting connection has the fewest number of links/nodes possible that traverse a third party network, such as the public internet. Further, the resolution request may indicate a client address, such as a public IP address, for a target client attached to the CPE. In this case, the resolution request indicates the SDN controller should select a PE device to connect the target client to the VPN, for example via an IPsec tunnel. This allows the CPE to request that the client or client(s) be directly connected to the VPN and hence act as endpoint(s) for the corresponding IPsec tunnels. This also removes the burden of some tunnel management from the CPE and shifts the burden to the client. The eNHRP resolution request may also contain a preferences field to indicate that the CPE and/or corresponding clients would like to receive multiple PEs instead of a single PE. This allows the CPE/client to select a PE. This also allows the CPE/client to establish multiple asymmetric connections.

At block 1107, the controller selects one or more PE devices coupled to a carrier network. Specifically, the controller selects PE devices that are positioned to couple the CPE and/or client nodes to a VPN operating over a SDWAN. The PEs are selected based on the information in the eNHRP registration request and the eNHRP resolution request from the CPE. For example, the PE devices may be selected based on geographic distance to a remote network (the branch network containing the CPE) and not based on PE device attachment to the VPN. This may also serve to minimize connection exposure to the public internet. In some cases, multiple PEs may be selected to support asymmetric connections, which may occur over different access technologies and/or access media. The PEs may also be selected to establish a connection between the CPE/clients and a subset of nodes in the VPN. Connections to the PEs can also be determined so that corresponding tunnels have endpoints at the PE and at the requesting client instead of at the PE and at the CPE.

At block 1109, the controller transmits an eNHRP resolution reply to the CPE. The eNHRP resolution reply indicates the PE devices selected at block 1107 to the CPE and/or corresponding clients. Accordingly, the information in the eNHRP resolution reply indicates the selected PEs, and hence supports the CPE/clients in establishing connections between the client nodes and the VPN via the PE devices. The eNHRP resolution reply may also contain other IP and tunnel addresses associated with the selected PEs so that the CPE/clients can establish the tunnels as directed. The eNHRP resolution reply may contain a code indicating that the included PE or PEs are associated with a connection with minimized exposure to a public internet when such a request is made in the eNHRP resolution request. In some cases, this may indicate that the signaled PE(s) are coupled to the provider network and not coupled to/authenticated into the VPN. Accordingly, the requestor can connect to another PE in the VPN via the signaled PE. Further, the PEs indicated in the eNHRP resolution reply may be positioned to support asymmetric connections between the client nodes and the VPN, for example via an LTE network, via an access network, via the public Internet, or combinations thereof. The PEs indicated in the eNHRP resolution reply may also be employed to establish a connection between the CPE/clients and a subset of nodes in the VPN. The PEs indicated in the eNHRP resolution reply may also be employed to establish tunnels having endpoints at the PE and at the requesting client instead of at the PE and at the CPE. Based on the information in the eNHRP resolution reply, the CPE can establish tunnels to the VPN and/or pass such information to devices/VMs in the corresponding network so such devices/VMs can establish tunnels to the VPN.

Figure 12:
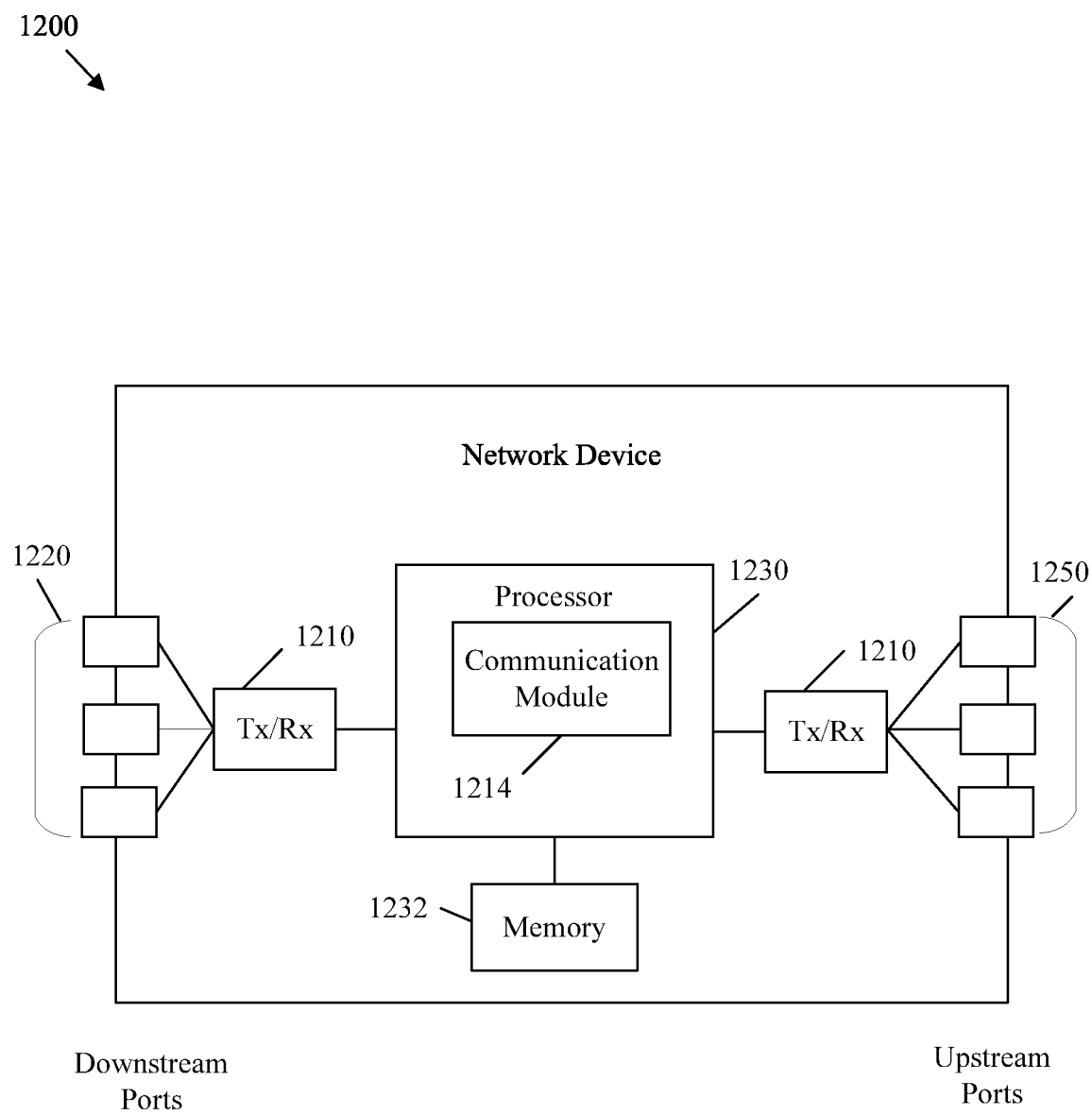
FIG. 12 is a schematic diagram of an example network device for operation in a SDWAN.

FIG. 12 is a schematic diagram of an example network device 1200 for operation in a SDWAN, such as a CPE 433 or a controller 435 in SDWAN 400. Depending on the example, the network device 1200 can implement methods 1000 or 1100. Further, the network device 1200 can communicate by sending and receiving eNHRP communications, such as an eNHRP registration request, an eNHRP resolution request, and/or an eNHRP resolution reply, which may employ example encodings as depicted and described with reference to FIGS. 5-9. Accordingly, the network device 1200 may be configured to implement or support the schemes/features/methods described herein. For instance, the features/methods in the disclosure may be implemented using hardware, firmware, and/or software installed to run on hardware. One skilled in the art will recognize that the term network device encompasses a broad range of devices of which network device 1200 is merely an example. Network device 1200 is included for purposes of clarity of discussion, but is in no way meant to limit the application of the present disclosure to a particular network device embodiment or class of network device embodiments.

The network device 1200 may be a device that communicates electrical and/or optical signals through a network, e.g., a controller, a switch, router, bridge, server, a client, a gateway, etc. As shown in FIG. 12, the network device 1200 may comprise transceivers (Tx/Rx) 1210, which may be transmitters, receivers, or combinations thereof. A Tx/Rx 1210 may be coupled to a plurality of downstream ports 1220 (e.g., downstream interfaces) for transmitting and/or receiving frames from other nodes and a Tx/Rx 1210 coupled to a plurality of upstream ports 1250 (e.g., upstream interfaces) for transmitting and/or receiving frames from other nodes, respectively. A processor 1230 may be coupled to the Tx/Rxs 1210 to process the data signals and/or determine which nodes to send data signals to. The processor 1230 may comprise one or more multi-core processors and/or memory devices 1232, which may function as data stores, buffers, etc. Processor 1230 may be implemented as a general processor or may be part of one or more application specific integrated circuits (ASICs) and/or digital signal processors (DSPs). The network device 1200 may comprise a communication module 1214, which may be configured to communicate with devices/VMs in a local network, communicate local network information to a controller, receive PEs, and/or establish IPsec tunnels with the received PEs, when the network device 1200 operates as a CPE. When the network device 1200 operates as a controller, the communication module 1214, which may be configured to receive local network information and associated requests from a CPE, select PEs based on the local network information, and communicate such PEs to the CPE. In either case, the communication module 1214 is employed to generate, transmit, receive, and/or read eNHRP communications as well as implement methods 1000 and/or 1100. The communication module 1214 may be implemented as a general purpose processor, a field programmable gate array (FPGA), an ASIC, a DSP, a microcontroller, etc. In alternative embodiments, the communication module 1214 may be implemented in processor 1230, as instructions stored in memory device 1232 (e.g., as a computer program product), which may be executed by processor 1230, and/or implemented in part in the processor 1230 and in part in the memory device 1232. The downstream ports 1220 and/or upstream ports 1250 may contain wireless, electrical and/or optical transmitting and/or receiving components, depending on the embodiment.

The disclosure includes a network device comprising: a transmitting means to transmit a resolution request to a software defined network (SDN) controller; a receiving means to receive a reply from the SDN controller, the reply indicating a plurality of provider edge (PE) devices coupled to a carrier network; and a processing means to cause the transmitting means and the receiving means to establish a plurality of asymmetric connections to a virtual private network (VPN) operating over a software defined wide area network (SDWAN) via the PE devices.

The disclosure includes a software defined network (SDN) controller comprising: a receiving means to receive an enhanced next hop resolution protocol (eNHRP) registration request from a network device, the eNHRP registration request including client information entries that indicate client local addresses of client nodes sharing a local area network with the network device; a processing means to select one or more provider edge (PE) devices coupled to a carrier network, the PE devices positioned to couple the client nodes to a virtual private network (VPN) operating over a wide area network (WAN); and a transmitting means to transmit an eNHRP resolution reply indicating the PE devices to the network device to support establishing connections between the client nodes and the VPN via the PE devices.

The disclosure includes a carrier network comprising: a plurality of provider edge (PE) means interconnected by a multi-protocol label switching (MPLS) network, the PE means configured to implement a wide area network connecting traffic from at least one data center network, at least one headquarter network, and at least one remote network; and a virtual private network (VPN) means configured to securely communicate the traffic between the data center network, the headquarter network, and the remote network via internet protocol security (IPsec) tunnels across the MPLS network, the remote network connected to the MPLS network by the VPN via at least one third party network, and the remote network containing at least one client that is connected to some but not all nodes in the VPN.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A software defined network (SDN) controller comprising:
   a receiver configured to receive incoming communication signals from a network device;
   a transmitter configured to transmit outgoing communication signals; and
   a processor coupled to the receiver and the transmitter, the processor configured to:
      process an enhanced next hop resolution protocol (eNHRP) registration request received from the incoming communication signals, the eNHRP registration request including client information entries that indicate client local addresses of client nodes sharing a local area network with the network device;
      select one or more provider edge (PE) devices coupled to a carrier network, the PE devices positioned to couple the client nodes to a virtual private network (VPN) operating over a wide area network (WAN);
      generate an eNHRP resolution reply indicating the PE devices to the network device to support establishing internet protocol security (IPsec) tunnels between the client nodes and the VPN via the PE devices; and
      include the eNHRP resolution reply in the outgoing communication signals.

2. The SDN controller of claim 1, wherein the at least one of the PE devices is coupled to the carrier network and not coupled to the VPN.

3. The SDN controller of claim 1, wherein the PE devices support asymmetric connections between the client nodes and the VPN.

4. The SDN controller of claim 1, wherein the client information entries of the eNHRP registration request further include client virtual network identifiers and tunnel identifiers associated with the client nodes.

5. The SDN controller of claim 1, wherein the eNHRP registration request includes a flag indicating the client nodes should not be completely connected to all nodes operating in the VPN.

6. The SDN controller of claim 1, wherein the receiver is further configured to receive a eNHRP resolution request containing a code requesting PE devices be selected with minimized exposure to a public internet.

7. A carrier network comprising:
   a plurality of provider edge (PE) devices interconnected by a multi-protocol label switching (MPLS) network, the PE devices configured to implement a wide area network connecting traffic from at least one data center network, at least one headquarter network, and at least one remote network; and
   a virtual private network (VPN) configured to securely communicate the traffic between the data center network, the headquarter network, and the remote network via internet protocol security (IPsec) tunnels across the MPLS network, the remote network connected to the MPLS network by the VPN via at least one third party network, and the remote network containing at least one client that is connected to some but not all nodes in the VPN.

8. The carrier network of claim 7, wherein the VPN is connected to clients in the remote network via a plurality of asymmetric connections over a plurality of communication media.

9. The carrier network of claim 7, further comprising a software defined network (SDN) controller configured to receive an enhanced next hop resolution protocol (eNHRP) registration request from the remote network, the eNHRP registration request including client information entries that indicate client local addresses of clients in the remote network.

10. The carrier network of claim 9, wherein the SDN controller is further configured to employ the client local addresses to control creation of IPsec tunnels directly from the clients in the remote network to the VPN.

11. The carrier network of claim 10, wherein the SDN controller is further configured to transmit an eNHRP resolution reply to the remote network, the eNHRP resolution reply indicating one or more PE devices for connection to the MPLS network, the PE devices indicated based on geographic distance to the remote network and not based on PE device attachment to the VPN.

12. A method implemented in a software defined network (SDN) controller, the method comprising:
receiving, by a receiver of the SDN controller, an enhanced next hop resolution protocol (eNHRP) registration request from a network device, the eNHRP registration request including client information entries that indicate client local addresses of client nodes sharing a local area network with the network device;
selecting, by a processor of the SDN controller, one or more provider edge (PE) devices coupled to a carrier network, the PE devices positioned to couple the client nodes to a virtual private network (VPN) operating over a wide area network (WAN); and
transmitting, by a transmitter of the SDN controller, an eNHRP resolution reply indicating the PE devices to the network device to support establishing internet protocol security (IPsec) tunnels between the client nodes and the VPN via the PE devices.

13. The method of claim 12, wherein the at least one of the PE devices is coupled to the carrier network and not coupled to the VPN.

14. The method of claim 12, wherein the PE devices support asymmetric connections between the client nodes and the VPN.

15. The method of claim 12, wherein the client information entries of the eNHRP registration request further include client virtual network identifiers and tunnel identifiers associated with the client nodes.

16. The method of claim 12, wherein the eNHRP registration request includes a flag indicating the client nodes should not be completely connected to all nodes operating in the VPN.

17. The method of claim 12, further comprising receiving, by the receiver, an eNHRP resolution request containing a code requesting PE devices be selected with minimized exposure to a public internet.

18. The SDN controller of claim 1, wherein the eNHRP resolution reply indicates IPsec tunnel endpoints that allow a remote network to connect the client nodes to some but not all nodes in the VPN.

19. The method of claim 12, wherein the eNHRP resolution reply indicates IPsec tunnel endpoints that allow a remote network to connect the client nodes to some but not all nodes in the VPN.

* * * * *